United States Patent
Marx et al.

(10) Patent No.: US 12,358,483 B2
(45) Date of Patent: Jul. 15, 2025

(54) METHOD FOR OPERATING A FORCE-SENSOR-LESS ELECTROMECHANICAL SERVICE BRAKE OF A VEHICLE AND A BRAKE SYSTEM

(71) Applicant: ZF Active Safety GmbH, Koblenz (DE)

(72) Inventors: Andreas Marx, Hartenfels (DE); Fabian Querbach, Lonnig (DE)

(73) Assignee: ZF Active Safety GmbH, Koblenz (DE)

( * ) Notice: Subject to any disclaimer, the term of this patent is extended or adjusted under 35 U.S.C. 154(b) by 138 days.

(21) Appl. No.: 18/463,544

(22) Filed: Sep. 8, 2023

(65) Prior Publication Data
US 2024/0083403 A1 Mar. 14, 2024

(30) Foreign Application Priority Data
Sep. 12, 2022 (DE) .......................... 102022123149.6

(51) Int. Cl.
*B60T 13/74* (2006.01)
*B60T 17/22* (2006.01)

(52) U.S. Cl.
CPC .......... *B60T 13/741* (2013.01); *B60T 17/221* (2013.01)

(58) Field of Classification Search
CPC ...... B60T 13/741; B60T 17/221; B60T 7/042; B60T 13/662; B60T 17/22; B60T 8/172; B60T 8/174; B60T 13/74; F16D 2121/24; F16D 2125/40; F16D 55/226
See application file for complete search history.

(56) References Cited

U.S. PATENT DOCUMENTS

| | | | | |
|---|---|---|---|---|
| 12,209,625 | B2* | 1/2025 | Carrara | F16D 65/18 |
| 2008/0048596 | A1* | 2/2008 | Konishi | B60T 13/741 |
| | | | | 188/158 |
| 2011/0246039 | A1* | 10/2011 | Takeda | F16D 65/18 |
| | | | | 701/70 |
| 2012/0292141 | A1* | 11/2012 | Takahashi | F16D 65/18 |
| | | | | 188/72.3 |
| 2014/0000992 | A1* | 1/2014 | Tajima | B60T 1/005 |
| | | | | 188/72.1 |
| 2014/0069750 | A1* | 3/2014 | Nohira | B60T 13/741 |
| | | | | 188/71.8 |
| 2017/0009830 | A1* | 1/2017 | Masuda | F16D 55/226 |
| 2017/0321773 | A1* | 11/2017 | Lee | F16D 55/226 |

FOREIGN PATENT DOCUMENTS

DE     102012201323 A1    8/2012

\* cited by examiner

*Primary Examiner* — Sizo B Vilakazi
(74) *Attorney, Agent, or Firm* — Kristin L. Murphy

(57) ABSTRACT

In a method for operating a force-sensor-less electromechanical service brake in a brake system of a vehicle, a current value of a braking contact point and a current profile of a force-displacement characteristic of the electromechanical service brake are determined as a function of the total rotation angle of a shaft of an electric motor of the electromechanical service brake. These values are determined in regular driving operation of the vehicle. In the case of a braking request, the electric motor is activated in accordance with the current value of the braking contact point and the current profile of the force-displacement characteristic in order to satisfy the braking request. The electric motor has a detection element, which detects the total rotation angle of the shaft and a rotation rate of the electric motor.

17 Claims, 2 Drawing Sheets

METHOD FOR OPERATING A FORCE-SENSOR-LESS ELECTROMECHANICAL SERVICE BRAKE OF A VEHICLE AND A BRAKE SYSTEM

CROSS-REFERENCE TO RELATED APPLICATION

This application claims priority to German Priority Application No. 102022123149.6, filed Sep. 12, 2022, the disclosure of which is incorporated herein by reference in its entirety.

TECHNICAL FIELD

The disclosure relates to a method for operating a force-sensor-less electromechanical service brake of a vehicle and to a brake system.

BACKGROUND

In the case of an electromechanical brake, in contrast to conventional hydraulically actuated brakes, an element moved by an electric motor, for example a ball screw, is provided, which acts on movable friction elements of the brake in order to close the brake. The force supplied by the electric motor is converted into a movement of the friction elements of the brake with respect to one another. For example, a brake pad is pressed against a brake disk and in this way the brake pressure required to close the brake is generated.

Electromechanical brakes can be used both as a parking brake and as a service brake. In contrast to the parking brake that secures the parked vehicle, the service brake is used to bring about a temporary vehicle deceleration while driving.

There is a desire to know the brake pressure or the braking force generated by the electric motor during the actuation of the brake. Since, owing to wear, but also owing to the effect of temperature during driving, among other factors, the necessary actuation travel of the brake changes over time, regular detection is necessary. For this purpose, it is customary to use force sensors. However, their use is space-consuming and expensive.

In particular, knowledge of the initial release clearance between the friction elements of the brake is useful for accurate setting of the braking force. The release clearance refers to the distance which the friction elements must cover relative to one another up to a braking contact point at which the friction elements come into contact with one another with a significant friction force.

SUMMARY

It is an object of the invention to make the operation of a brake system simple, safe and inexpensive despite the use of force-sensor-less electromechanical service brakes.

A method for operating a force-sensor-less electromechanical service brake in a brake system of a vehicle is disclosed. The method can include:
  determining a current value of a braking contact point of the electromechanical service brake from a dependence on a total rotation angle of a shaft of an electric motor of the electromechanical service brake and storing the current value of the braking contact point,
  determining a current profile of a force-displacement characteristic of the electromechanical service brake from a dependence on the total rotation angle of the shaft of the electric motor of the electromechanical service brake and storing the current profile of the force-displacement characteristic, wherein the current value of the braking contact point and the current profile of the force-displacement characteristic are in each case determined in regular driving operation of the vehicle, and
  activating the electric motor in accordance with the current value of the braking contact point and the current profile of the force-displacement characteristic in the case of a braking request in order to satisfy the braking request.

In this way, it is possible to reliably carry out a braking process to fulfil a braking request even without a force sensor.

To determine the current value of the braking contact point and the current profile of the force-displacement characteristic, use is made of the total rotation angle as a directly accessible, easily measurable parameter of the electric motor of the electromechanical service brake.

The total rotation angle of the shaft of the electric motor is, as a good approximation, directly proportional to the relative movement of the friction elements of the electromechanical service brake. For example, the total rotation angle of the shaft of the electric motor is proportional to the total rotation angle of a spindle of a ball screw that moves an actuating piston which acts on the friction elements of the electromechanical service brake in order to close this brake. Thus, the position of the friction elements can be unambiguously determined via the total rotation angle of the shaft of the electric motor. There is therefore no need for any other way of measuring the displacement.

In principle, the aim is to avoid actuation of the electromechanical service brakes outside of a current braking process. Therefore, both the current value of the braking contact point and the current profile of the force-displacement characteristics can be determined during actuation of at least one brake of the brake system.

It has been found that, if the force-displacement characteristic has a sufficient resolution, the braking requests initiated by the vehicle driver or by autonomous systems of the vehicle can be satisfied even without directly measuring the force during the actuation of the electromechanical service brake. For this purpose, the force-displacement characteristic is measured with a resolution which is sufficient for all common actuating forces in the brake and thus all common relative positions of the friction elements of the brake. In principle, significantly more than two measuring points are used for this purpose.

The activation of the brake thus takes place essentially through knowledge of the relationship between the total rotation angle of the shaft of the electric motor and the braking force at the position of the friction elements of the brake which is determined thereby. For this purpose, knowledge of the force-displacement characteristic of the brake and of the braking contact point has been found to be sufficient.

The braking contact point is used, on the one hand, to set the release clearance. The release clearance is normally set by mechanically changing the position of the friction elements of the brake while driving in the unactuated state of the brake.

On the other hand, the braking contact point also represents a zero point for the force-displacement characteristic, from which the braking force begins to increase significantly with a further displacement of the friction elements of the brake.

Since the braking contact point can already shift significantly even during a trip and even very small changes are significant for the release clearance, the current value of the braking contact point can be determined repeatedly at time intervals during a trip. For example, the current value of the braking contact point is determined during at least some normal braking processes of the vehicle during a trip. The adjustment of the release clearance which is possible in this way during a trip ensures that the drag torques of the brakes are reduced as far as possible.

It is possible to carry out determination of the current braking contact point during each braking process, at least for some brakes of the vehicle.

In normal braking processes, there is as a rule sufficient time available to carry out the determination of the braking contact point at least at the service brakes on one axle of the vehicle.

The determination of the current value of the braking contact point can be carried out, for example, during a normal braking process at those electromechanical service brakes on one axle of the vehicle which are not being braked at this time. In another exemplary arrangement, a regeneration process by a regenerative electric drive motor of the vehicle can be used for measurement at some or all of the force-sensor-less electromechanical service brakes of the vehicle.

In general, determination of the current value of the braking contact point is aborted when a deviation from a normal braking process is detected. This can be, for example, emergency braking or a braking process in which a responsible control unit of the brake system activates an ABS system.

In an exemplary arrangement, a dependence on a rotation rate of the shaft of the electric motor is used for determining the braking contact point. This parameter is directly measurable and can be determined easily in an unambiguous way.

For example, the current value of the braking contact point is determined by supplying the electric motor with a constant current and measuring the rotation rate during the closing of the electromechanical service brake. During this process, a displacement point at which the rotation rate is reduced is determined. This displacement point is obtained by evaluation of the total rotation angle associated with this point in time.

From the reduction of the rotation rate or the speed of revolution of the shaft of the electric motor, it is possible to deduce the braking contact point since the mechanical resistance to the closing of the brake increases from the contact of the friction elements. In this case, activation can be carried out with a constant, unregulated current. If appropriate, several repetitions of this process are provided in order to obtain a more accurate, averaged value.

The current profile of the force-displacement characteristics of the brake, on the other hand, can be determined during the closing of a parking brake when the vehicle is being parked.

For this purpose, for example, the electric motor is activated with a steadily increasing current and the total rotation angle is detected, resulting in a time profile of the total rotation angle, from which the displacement-force characteristic is determined. The increase should be so slow that no dynamic changes occur as far as possible. The current flow can be unregulated in order to prevent unsteadiness due to feedback control. The force-displacement characteristic is determined from the known electric current values and the displacement determined via the total rotation angle of the shaft of the electric motor.

There is no need for feedback control during the closing of the parking brake. Moreover, there is sufficient time available during this process to determine the force-displacement characteristic.

The parking brake can be a device implemented separately from the electromechanical service brakes of the vehicle. However, it can also be formed by one or more of the electromechanical service brakes themselves, which additionally have a locking mechanism that is activated when the brake is closed and thus allows the electric motor to be switched off and the respective electromechanical service brake to still be kept closed.

In an exemplary arrangement, a basic zero value of the brake is recorded at the workshop and stored as a reference value. From this reference value, the position of the braking contact point and the force-displacement characteristic can be determined. This reference value can be determined, for example, by the electric motor carrying out a reference run onto a rear stop of the electromechanical service brake outside normal driving operation.

When the vehicle is started at the beginning of a new trip, values stored for the braking contact point and the profile of the force-displacement characteristic are generally used as initial values for the current value of the braking contact point and the current profile of the force-displacement characteristic. The values last stored when the vehicle was parked are used, for example. However, it is also possible to refer back to earlier stored values from the previous history, e.g. those from the last trip, which correlate better with a current temperature for instance. In particular, these values are used until they are replaced by newly determined values.

The disclosure also describes a brake system of a vehicle having at least one force-sensor-less electromechanical service brake, which system is designed to carry out a method described above. The electromechanical service brake comprises an electric motor, which has a shaft that is coupled to a linearly displaceable actuating piston, which acts on friction elements of the electromechanical service brake to generate a braking force. The electric motor has a detection element, which detects a total rotation angle of the shaft of the electric motor and a rotation rate of the electric motor. In addition, the brake system has a control unit, which is designed to supply the electric motor with a predetermined electric current profile and to determine a displacement travel of the actuating piston from the total rotation angle.

The shaft of the electric motor, the actuating piston and, where applicable, a ball screw arranged therebetween are advantageously designed to be so rigid, being made of metal for example, that no significant deformation occurs at these components when the shaft of the electric motor is rotated, and thus the total angle of rotation of the shaft of the electric motor can be assumed to be directly proportional to the movement of the actuating piston.

The detection element is, for example, a speed sensor on an electric motor of the electromechanical service brake, which can also detect the total rotation angle of the shaft.

The control unit can be designed in such a way that it causes the electric motor to be supplied with current with a predetermined profile as a function of braking requests in order to detect the current value of the braking contact point in the case of a first type of braking request and the current profile of the force-displacement characteristic of the electromechanical service brake in the case of a second type of braking request. As already described above, the first type of braking request can be a normal braking process during a trip of the vehicle. The second type of braking request can represent the closing of the parking brake when the vehicle is parked.

To determine the current value of the braking contact point, the profile of the current supply to the electric motor is, for example, the application of a constant, unregulated current. Determining the current profile of the force-displacement characteristic, for example, involves an unregulated electric current profile that rises with a constant slope.

In addition, the control unit should, of course, be designed in such a way that it can activate the individual electromechanical service brakes of the brake system on the basis of their stored braking contact points and their stored force-displacement characteristics during a braking process in order to fulfil a braking request.

The electromechanical service brakes are normally wheel-specific brake actuators which are activated for actuation separately by the control unit of the brake system.

In principle, the braking contact point should in each case be determined symmetrically and simultaneously for all brakes on one axle of the vehicle.

BRIEF DESCRIPTION OF DRAWINGS

The disclosure will be described in more detail below by an exemplary arrangement with reference to the attached figures. In the figures.

DETAILED DESCRIPTION

Figure 1:
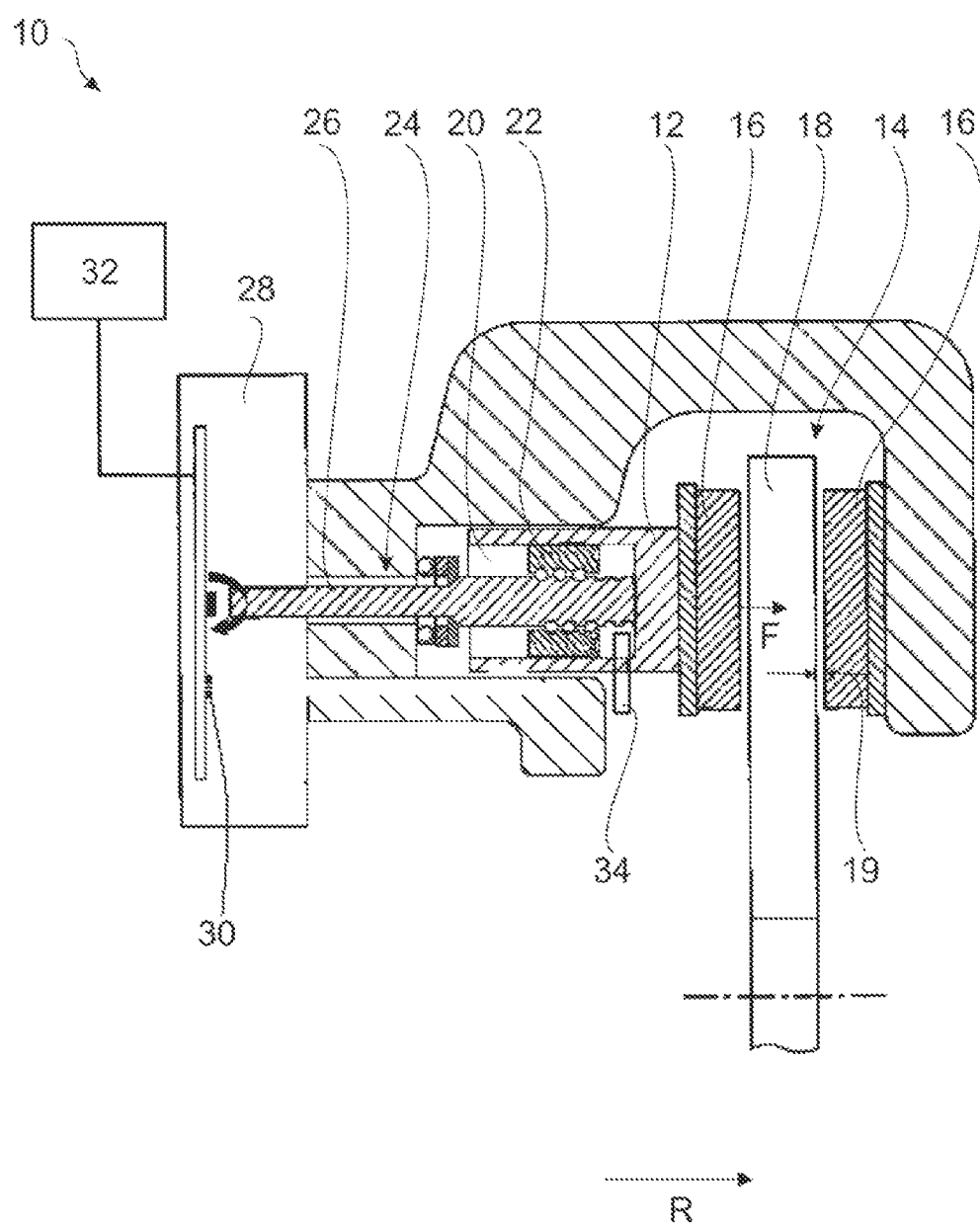
FIG. 1 shows a schematic illustration of a force-sensor-less electromechanical service brake, which can be used in the method according to the disclosure and in the brake system according to the disclosure.

FIG. 1 shows, by way of example, a force-sensor-less electromechanical service brake 10 of a vehicle 11, which comprises an actuating piston 12, which acts on a brake assembly 14 and transmits a braking force F to the latter.

The brake assembly 14 comprises interacting friction elements. In the example shown here, the brake assembly 14 is a known floating calliper brake with two brake pads 16 and a brake disc 18 arranged therebetween as friction elements. In the unactuated state, the brake pads 16 are spaced apart from the brake disc 18 by a release clearance 19. This can be about 0.3 mm, for example.

A recirculating ball nut 22 of a ball screw 24 is accommodated in an internal cavity 20 of the actuating piston 12. A spindle 26 of the ball screw 24 is coupled to an electric motor 28, the shaft of which can set the spindle 26 in rotation, moving the ball nut 22 linearly along the spindle 26.

The recirculating ball nut 22 moves the actuating piston 12 in the direction towards the brake assembly 14, here in the direction of one of the brake pads 16.

A detection element 30 is arranged in the region of the electric motor 28 in such a way that it can measure a rotation rate of the shaft of the electric motor 28. Here, the detection element 30 is furthermore designed in such a way that it detects a total rotation angle $\alpha$ of the shaft, which is directly proportional to a total rotation angle of the spindle 26. In this case, the total rotation angle $\alpha$ is considered in each case starting from a known zero point.

The determined values are transferred to a control unit 32, processed and, if appropriate, stored. The control unit 32 communicates in a suitable manner with other components of a brake system 43 as well as with other systems in the vehicle.

In the exemplary arrangement shown here, the electromechanical service brake 10 comprises a locking mechanism 34, which is designed in such a way that it can hold the brake assembly 14 in a closed position without the electric motor 28 having to be supplied with current. In this way, the electromechanical service brake 10 can also be used as a parking brake when the vehicle 11 is parked at the end of the trip. During normal driving operation, the locking mechanism 34 is fully released.

The total rotation angle $\alpha$ is a directly measurable parameter which provides an unambiguous relationship between the rotation of the shaft of the electric motor 28 and the position of the actuating piston 12.

In the service brake 10 shown here, all components in the force transmission path are connected to one another in a sufficiently rigid way and without significant play. They consist of metal, for example. There is therefore an unambiguous proportional relationship between the total rotation angle $\alpha$ of the shaft of the electric motor 28 and the position of the actuating piston 12. The position of the actuating piston 12 is reproducible and can be determined without hysteresis effects. Since the position of the actuating piston 12 is directly related to the braking force F, the total rotation angle $\alpha$ can be used as a direct measure of the actuating force F of the electromechanical service brake 10 (see FIG. 2).

Figure 2:
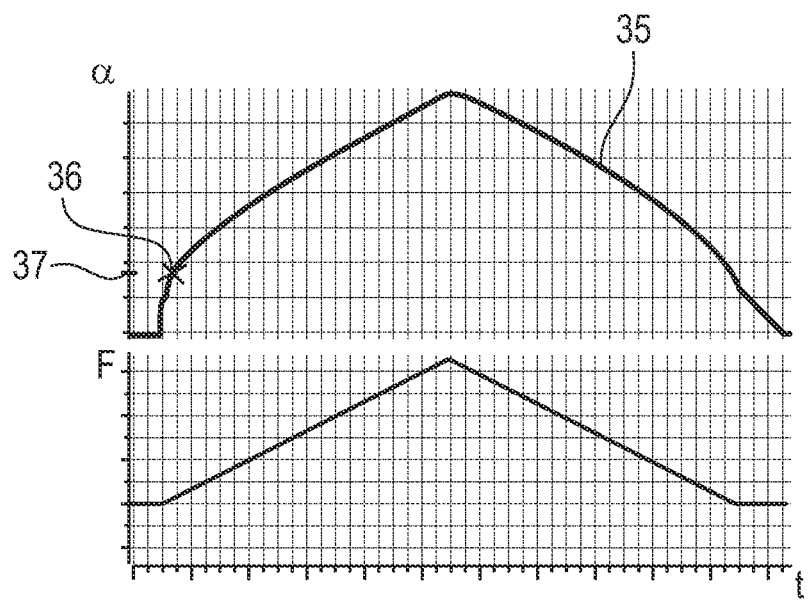
FIG. 2 shows a schematic illustration of the relationship between the braking force and the total rotation angle.

FIG. 2 shows the relationship between the total rotation angle $\alpha$ and the braking force F in a simultaneously measured time profile. The time profile 35 of the total rotation angle $\alpha$ of the shaft of the electric motor 28 is shown together with the associated time profile of the braking force F of the electromechanical service brake 10.

It is a simple matter to generate a force-displacement characteristic (not shown) of the electromechanical service brake 10 from these data, for example by calculation, simulation or simultaneous measurement of the total rotation angle $\alpha$ and the braking force F in advance. In general, the energy supply is also known from a specification of the operating current of the electric motor 28. In all cases, it is possible, on the basis of these known variables, to determine a current force-displacement characteristic of the electromechanical service brake 10 by measuring the time profile of the total rotation angle $\alpha$.

FIG. 2 also clearly shows a kink in the curve of the time profile 35, which coincides with the increase in the braking force F. This kink identifies a braking contact point 36 (also called a touch disc point). The braking contact point 36 denotes a contact point of the friction elements of the electromechanical service brake 10, from which the release clearance 19 is overcome and a significant friction effect occurs. When this braking contact point 36 is reached, the brake begins to close and build up the braking force F.

The displacement point 37 at this total rotation angle indicates the position for setting the release clearance 19. In addition, it also represents the current zero point of the force-displacement characteristic.

In order to determine the braking contact point 36, the actuating piston 12 is moved from a known reference point in the direction of the brake assembly 14 by the rotation of the shaft of the electric motor 28. A constant, unregulated current is applied to the electric motor 28. Until the release clearance 19 has been overcome, the shaft rotates at a high rotation rate since the electric motor 28 does not have to overcome any significant mechanical resistance. However, from the braking contact point 36, this resistance rises, leading to a reduction in the rotation rate from the displacement point 37. This drop in the rotation rate is measured by the detection element 30.

For determination of the braking contact point 36, the electromechanical service brake 10 is not completely closed. This process requires only a short period of time and does not generate any significant vehicle deceleration. This measurement is therefore carried out during the trip, such as repeatedly at several points in time.

Figure 3:
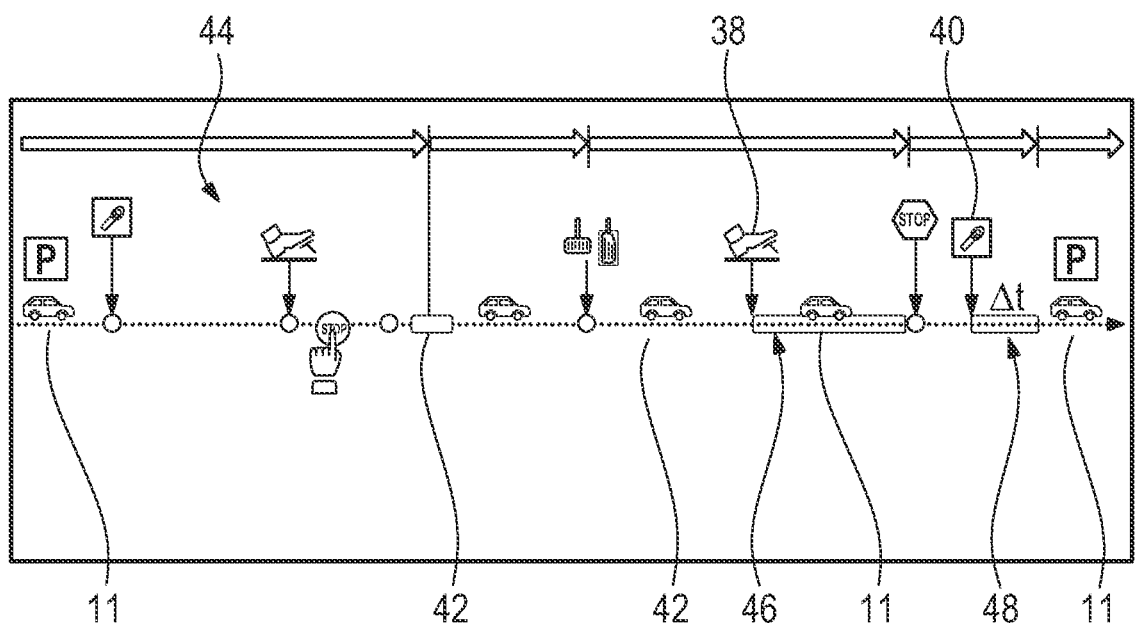
FIG. 3 shows a schematic sequence of a method according to the disclosure in a vehicle brake system according to the disclosure.

For this purpose, a normal braking request 38 is used, for example, in which a braking request for deceleration of the vehicle 11 is implemented (see also FIG. 3).

By way of example, during a normal braking process, the electromechanical service brakes are, for example, initially actuated at only one axle of the vehicle 11 to provide a braking force F to decelerate the vehicle and fulfil the braking request. During a normal braking process, the vehicle speed initially decreases only moderately. During the increase in the braking force F, there is therefore sufficient time to carry out the determination of the current value of the braking contact point 36 at the electromechanical brakes 10 on the axle whose brakes have not yet been actuated.

The determination of the current value of the braking contact point 36 is in each case carried out symmetrically and simultaneously on all brakes 10 of an axle.

If a regenerative function of a drive motor is used to fulfil the braking request (not illustrated), then, for example, the braking force is initially applied by the drive motor alone. As an option, the current values of the braking contact point 36 are determined at all force-sensor-less electromechanical brakes 10 of the vehicle 11 during this phase, if appropriate also at several axles at the same time.

It is possible to determine the current value of the braking contact point 36 during each braking process. However, it is also conceivable to carry out this determination according to some other predetermined scheme.

The force-displacement characteristic of the electromechanical service brake 10 is also determined via the detection element 30. This is accomplished by moving the actuating piston 12 in the direction R until the brake 10 is completely closed, wherein the total rotation angle $\alpha$ of the shaft of the electric motor 28 is measured.

The force-displacement characteristic usually changes only slightly over a single trip of the vehicle. Therefore, the force-displacement characteristic is measured only once per trip, for example. For this purpose, the time period $\Delta t$ for closing 40 a parking brake of the vehicle 11 is used when parking the vehicle (see FIG. 3).

In order to traverse the force-displacement characteristic, the electric motor 28 is here supplied with a steadily increasing current by a known, unregulated, rising current ramp. At the same time, the time profile of the total rotation angle $\alpha$ of the shaft of the electric motor 28 is measured by the detection element 30. The relationship between the total rotation angle $\alpha$ and the braking force F can be determined as described above. This is used to determine the current profile of the force-displacement characteristic.

Both the braking contact point 36 and the force-displacement characteristic are determined separately for each individual one of the force-sensor-less service brakes 10.

In one variant, in the time period $\Delta t$, all the force-sensor-less electromechanical service brakes 10 of the brake system 43 are moved from the completely open to the completely closed position and the total rotation angle $\alpha$ of the shaft of the electric motor 28 is measured as a function of the supplied current for each of the electromechanical service brakes 10. These data are transferred to the control unit 32, where they are processed in order to determine the current force-displacement characteristics. These are stored in the control unit 32 and are used as a basis for the braking processes of the next trip (see also step 42 in FIG. 3).

This method can also be carried out if at least one of the force-sensor-less electromechanical service brakes 10 itself acts as a parking brake. Since the locking mechanism 34 is not closed until the brake has reached its completely closed state, and this process is not particularly time-critical, the closing of the electromechanical service brake 10 during the determination of the force-displacement characteristic can be used to close the parking brake.

Other force-sensor-less electromechanical service brakes 10 of the vehicle 11 can be measured as described above during the closing of the parking brake.

FIG. 3 shows how, in a brake system 43, the relearning of the braking contact point 36 and the force-displacement characteristics of the force-sensor-less electromechanical service brakes 10 in the vehicle 11 is carried out during the driving operation of the vehicle 11.

From the start of a trip and the starting of the on-board systems of the vehicle 11 (step 44 in FIG. 3), the last stored values for the braking contact point 36 stored in the control unit 32 and the force-displacement characteristics of the electromechanical service brakes 10 are initially used to activate the electromechanical service brakes 10 of the vehicle 11 in order to implement braking requests.

It a suitable braking request 38 is then detected in the subsequent course of the trip, a current value for the braking contact point 36 is determined in the manner described above (see step 46 in FIG. 3). If this step 46 can be carried out without disturbances, an updated value for the braking contact point 36 is available for the subsequent braking processes, possibly already for the current braking process, for at least some of the electromechanical service brakes 10.

In the course of the trip, step 46 can be carried out at multiple different times.

If the vehicle is parked at the end of the trip and a parking brake is closed in step 40, the time period $\Delta t$ required for this is used in step 48 to determine a current profile of the force-displacement characteristics of one or more electromechanical service brakes 10.

The invention claimed is:

1. Method A method for operating a force-sensor-less electromechanical service brake in a brake system of a vehicle, comprising:

determining a current value of a braking contact point of the electromechanical service brake from a dependence on a total rotation angle ($\alpha$) of a shaft of an electric motor of the electromechanical service brake and storing the current value of the braking contact point, determining a current profile of a force-displacement characteristic of the electromechanical service brake from a dependence on the total rotation angle ($\alpha$) of the shaft of the electric motor of the electromechanical service brake and storing the current profile of the force-displacement characteristic, wherein the current value of the braking contact point and the current profile of the force-displacement characteristic are in each case determined in regular driving operation of the vehicle, and activating the electric motor in accordance with the current value of the braking contact point and the current profile of the force-displacement characteristic in the case of a braking request in order to satisfy the braking request.

2. The method according to claim 1, wherein the current value of the braking contact point and the current profile of the force-displacement characteristic are always determined during actuation of at least one brake of the brake system.

3. The method according to claim 1, wherein the current value of the braking contact point is determined at least during some normal braking processes of the vehicle during a trip.

4. The method according to claim 1, wherein a dependence on a rotation rate of the shaft of the electric motor is used for determining the current value of the braking contact point.

5. The method according to claim 4, wherein the current value of the braking contact point is determined by supplying the electric motor with a constant current and measuring the rotation rate during the closing of the electromechanical service brake, wherein a displacement point at which the rotation rate is reduced is determined.

6. The method according to claim 1, wherein the current profile of the force-displacement characteristic is determined during the closing of a parking brake when the vehicle is being parked.

7. The method according to claim 6, wherein the electric motor is activated with a steadily increasing current and the total rotation angle is detected, resulting in a time profile of the total rotation angle, from which the displacement-force characteristic is determined.

8. The method according to claim 1, wherein values stored for the braking contact point and the profile of the force-displacement characteristic are used as initial values for the current value of the braking contact point and the current profile of the force-displacement characteristic when the vehicle is started.

9. A brake system of a vehicle having at least one force-sensor-less electromechanical service brake, for carrying out a method according to claim 1, wherein the electromechanical service brake comprises an electric motor which has a shaft that is coupled to a linearly displaceable actuating piston, which acts on friction elements of the electromechanical service brake to generate a braking force (F), wherein the electric motor has a detection element, which detects a total rotation angle ($\alpha$) of the shaft of the electric motor and a rotation rate of the electric motor, and the braking system has a control unit, which is designed to supply the electric motor with a predetermined electric current profile and to determine a displacement travel of the actuating piston from the total rotation angle ($\alpha$).

10. The brake system according to claim 9, wherein the control unit is configured to cause the electric motor to be supplied with current with a predetermined profile as a function of braking requests of the vehicle in order to determine the current value of the braking contact point in the case of a first type of braking request and the current profile of the force-displacement characteristic of the electromechanical service brake in the case of a second type of braking request.

11. A method for operating a force-sensor-less electromechanical service brake in a brake system of a vehicle, comprising:
determining a current value of a braking contact point of the electromechanical service brake from a dependence on a total rotation angle ($\alpha$) of a shaft of an electric motor of the electromechanical service brake,
determining a current profile of a force-displacement characteristic of the electromechanical service brake from a dependence on the total rotation angle ($\alpha$) of the shaft of the electric motor of the electromechanical service brake, and
activating the electric motor in accordance with the current value of the braking contact point and the current profile of the force-displacement characteristic.

12. The method according to claim 11, wherein the current value of the braking contact point and the current profile of the force-displacement characteristic are determined during actuation of at least one brake of the brake system.

13. The method according to claim 11, wherein the current value of the braking contact point is determined at least during braking processes of the vehicle during a trip.

14. The method according to claim 11, wherein a dependence on a rotation rate of the shaft of the electric motor is used for determining the current value of the braking contact point.

15. The method according to claim 14, wherein the current value of the braking contact point is determined by supplying the electric motor with a constant current and measuring the rotation rate during the closing of the electromechanical service brake, wherein a displacement point at which the rotation rate is reduced is determined.

16. The method according to claim 11, wherein the current profile of the force-displacement characteristic is determined during the closing of a parking brake when the vehicle is being parked.

17. The method according to claim 11, wherein the current value of the braking contact point and the current profile of the force-displacement characteristic are determined during a driving operation of the vehicle.

* * * * *